(12) United States Patent
Eikenbery

(10) Patent No.: US 7,016,901 B2
(45) Date of Patent: Mar. 21, 2006

(54) SYSTEM AND METHOD FOR DISTRIBUTED DATABASE MANAGEMENT OF GRAPHIC INFORMATION IN ELECTRONIC FORM

(75) Inventor: Sean A. Eikenbery, Harpers Ferry, WV (US)

(73) Assignee: Ideal Scanners & Systems, Inc., Rockville, MD (US)

( * ) Notice: Subject to any disclaimer, the term of this patent is extended or adjusted under 35 U.S.C. 154(b) by 566 days.

(21) Appl. No.: 10/207,237

(22) Filed: Jul. 30, 2002

(65) Prior Publication Data

US 2003/0028538 A1 Feb. 6, 2003

Related U.S. Application Data

(60) Provisional application No. 60/308,572, filed on Jul. 31, 2001.

(51) Int. Cl.
*G06F 17/30* (2006.01)

(52) U.S. Cl. ............... 707/10; 707/102; 707/104.1; 715/502

(58) Field of Classification Search .............. 707/1–10, 707/100–102, 104.1; 715/500, 502, 530
See application file for complete search history.

(56) References Cited

U.S. PATENT DOCUMENTS

| 5,903,904 | A | * | 5/1999 | Peairs .................... 715/526 |
| 6,040,825 | A | * | 3/2000 | Yamamoto et al. ......... 345/173 |
| 6,182,090 | B1 | * | 1/2001 | Peairs .................... 715/500 |
| 6,249,787 | B1 | * | 6/2001 | Schleimer et al. ............ 707/10 |
| 6,332,146 | B1 | * | 12/2001 | Jebens et al. ............ 707/104.1 |
| 6,377,995 | B1 | * | 4/2002 | Agraharam et al. ........ 709/231 |
| 2001/0042075 | A1 | * | 11/2001 | Tabuchi ..................... 707/500 |

* cited by examiner

*Primary Examiner*—Debbie M. Le
(74) *Attorney, Agent, or Firm*—Rosenberg, Klein & Lee

(57) ABSTRACT

A system (10) for managing a distributed database of electronic data files generally includes at least one host platform (100) disposed at a first site, at least one storage facility (200) disposed at a second site remote therefrom, and one or more user platforms (300) disposed at third sites remote from the first and second sites. The storage facility (200) retrievably stores a plurality of electronic data files for generating graphic images. The host platform (100) is configured to automatically control access by user platforms (300) to the electronic data files and maintains a system index table containing for each of the stored electronic data files at least one file record of identifying attributes corresponding thereto. The host platform (100) is operable to automatically generate the file record in accordance with a preselected set of configurational parameters and to selectively retrieve at least portions of the electronic data files for graphic reproduction at a user platform (300).

18 Claims, 10 Drawing Sheets

SYSTEM AND METHOD FOR DISTRIBUTED DATABASE MANAGEMENT OF GRAPHIC INFORMATION IN ELECTRONIC FORM

RELATED U.S. APPLICATION DATA

This Application is based on U.S. Provisional Patent Application, Ser. No. 60/308,572, filed Jul. 31, 2001.

BACKGROUND OF THE INVENTION

Field of the Invention

The subject database management system is generally directed to a computer system for enabling centralized access to a plurality of digitally acquired data files maintained at a plurality of network-linked sites. More specifically, the subject database management system employs hardware and software components to yield convenient and efficient access to the distributed data files for a plurality of platforms residing at remotely-located user sites.

With the advent of digital technology, generally, and the rapid advances in microprocessor-based system capabilities, reliance upon the generation and maintenance of documents and records in digital form is becoming increasingly prevalent in virtually all fields of endeavor. Hence, it is becoming increasingly more necessary to transduce even data already fixed upon paper or other more traditional mediums to electronic files stored in digital form.

In various architectural, engineering, or manufacturing applications, for instance, the prevailing use of computer aided design/drafting or evaluation systems rely quite critically upon the generation and maintenance of graphic renderings electronically represented by digital data files. The importance of controlled, though ready and unobstructive, access to such data files by individual users is rather self-evident, yet a number of significant factors typically hinder the realization of that controlled accessibility.

First, the great number of drawings requiring maintenance for various parts and/or structures of even modest complexity requires the maintenance of a correspondingly great number of digital data files. The sheer number of such data files requiring maintenance and the diverse sources of their generation often make it quite impracticable to maintain the files at a common location, much less on a common computing platform. Indeed, data files in many applications are maintained unavoidably at remotely distributed sites, on distributed computing platforms that may be interconnected as nodes of a computer network.

Recent advances in computer network and digital communications technologies have significantly improved the speed and efficiency with which data may be shared by remotely located sites across a network interconnecting them. The enormity of a typical graphic file's size, however, well exceeds in most cases that which the prevailing bandwidth capacity adequately supports. This makes for extremely cumbersome data transfers—a severe hindrance where a user merely wishes to browse through a series of drawings prior to actually initiating any action upon them.

What is more, sufficient diversity of format in the digital data files generated by various computer-assisted tools and the various operating system environments in which they are deployed often undermines uniformity even amongst digital data files generated by computer platforms of a common enterprise. Data files may be generated and maintained at one remote site of the enterprise by a Unix platform, for example, whereas they may be generated and maintained at others of the enterprise's remote sites by PC and Macintosh platforms.

There is, therefore, a need for a database management system for establishing and maintaining in a highly responsive and efficient manner centralized access to the files of a distributed database for a plurality of users. There is a need for such a database management system that effectively indexes and controls from a host site data files stored locally and remotely at one or more sites linked thereto via a computer network. There is a need, moreover, for such a database management system that effectively accommodates both user and database maintenance platforms that may be operating with a plurality of predetermined data formats within a plurality of predetermined computing environment types. There is, further, a need for such a database management system providing centralized access to a plurality of distributed database files in sufficiently efficient and flexible manner that a user may retrieve and accumulate in one or more user sets a collection of data files and subsequently assign thereto one or more predetermined action steps such as printing or delivery.

SUMMARY OF THE INVENTION

It is a primary object of the present invention to provide a database management system which provides for a plurality of users through a host site centralized access to a plurality of files forming a distributed database.

It is another object of the present invention to provide a database management system enabling users to perform streamlined browsing and viewing of graphically rendered data files of a distributed database prior and to actuate one or more actions steps thereon.

It is yet another object of the present invention to provide a database management system operable to automatically generate and update data file indexing information including Internet link and file attribute information.

It is still another object of the present invention to provide a database management system that enables users to view a graphically rendered database file retrieved from a distributed data base without downloading the file in its entirety.

It is a further object of the present invention to provide a database management system that enables sufficient control at a host site for a system administrator to both monitor and configure both the nature and scope of a particular user's access to a distributed database.

These and other objects are attained in accordance with the present invention by the subject database management system. The subject database management system generally comprises: at least one host platform disposed at a first site, at least one storage facility disposed at a second site remote from the first site, and at least one user platform disposed at a third site remote from the first and second sites. The storage facility and user platform are computer network coupled to the host platform for communication therewith. The storage facility retrievably stores a plurality of electronic data files for generating graphic images. The host platform is configured to automatically control access to the electronic data files by the user platform. The host platform maintains a system index table containing for each of the electronic data files at least one file record of identifying attributes corresponding thereto. The host platform is operable to automatically generate the file record in accordance with a preselected set of configurational parameters. The host platform includes a plurality of application modules selectively executable responsive to actuation by the user platform. The host platform is thereby operable to selectively retrieve at least portions of the electronic data files for graphic reproduction at the user platform.

In a preferred embodiment, the host platform is operably coupled to the user platform by a publicly accessible network connection and, to the storage facility, by a privately accessible network connection. The host platform is preferably adapted for concurrent access by a plurality of user platforms via the publicly accessible network connection. Responsive to predetermined user-selected prompts, the host platform makes available to a given user platform a plurality of programmably implemented executable modules whereby the user platform may efficiently access at least one electronic data file residing at the first or second sites.

Toward that end, the host platform establishes for the user one or more selectable control links for the desired electronic data files. It operates to generate responsive to user selection of a particular electronic data file resampled images of selected portions of that electronic data file.

The host platform preferably includes a workstation and a server operably coupled thereto. The workstation includes among its components those for automatically controlling the transduction of paper documents to electronic data file form, and the appropriate storage and indexing into a system index table of the resulting electronic data files. The server also includes among its components those for monitoring one or more predetermined computing platforms for electronic data files to be newly-incorporated into the subject system and appropriately indexing them. It preferably also includes a search engine component for acquiring and processing a user-provided query for one or more of the prestored electronic data files. The server preferably further includes a plurality of application modules for controlling the execution of various predetermined user-selectable actions. Exemplary ones of such application modules include an intrashell module; an intrafile module; an intradocs module; an intraview module; an intrauser module; an intraprint module; an intrapref module; and, an intraadmin module.

DETAILED DESCRIPTION OF THE PREFERRED EMBODIMENTS

Figure 1:
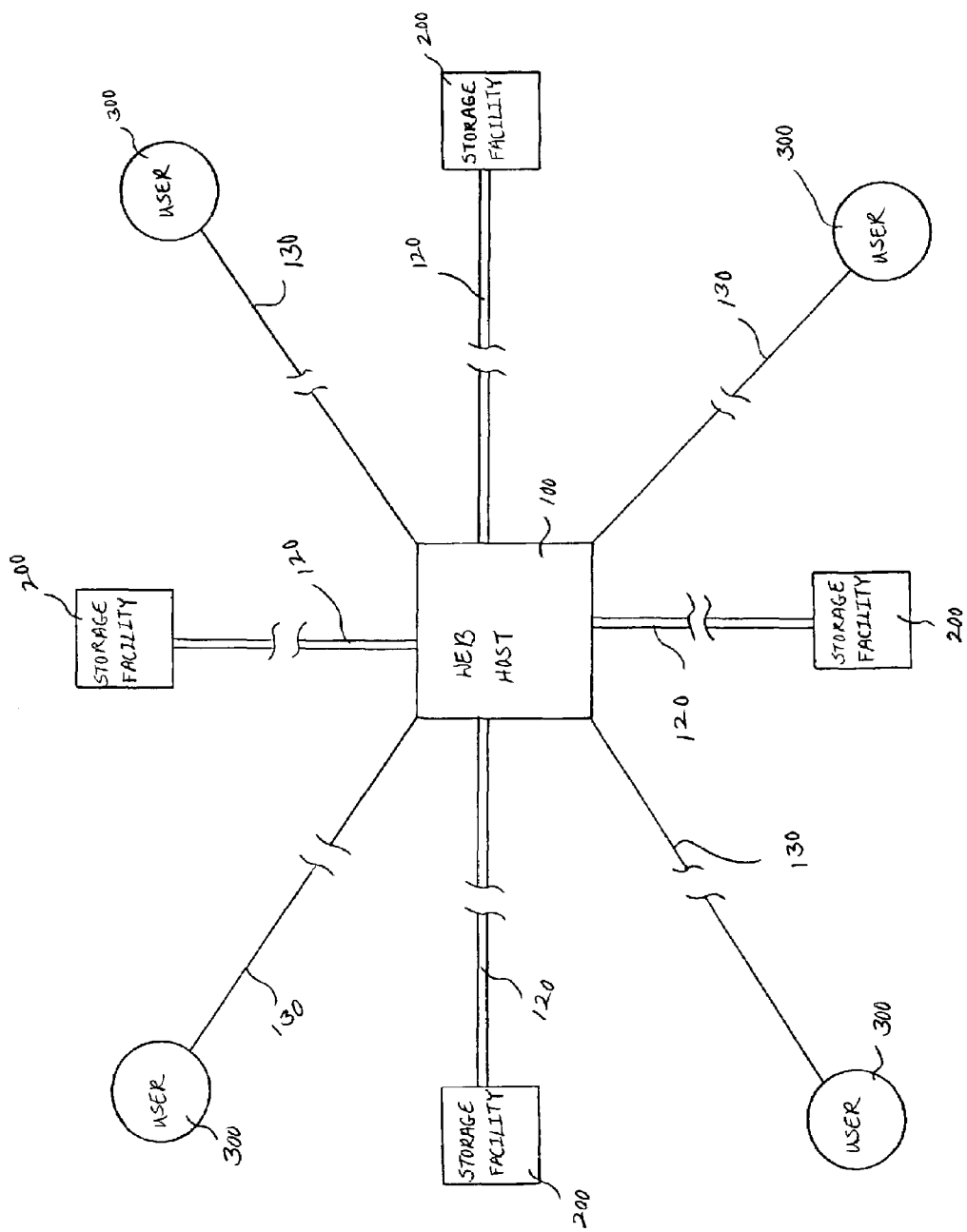
FIG. 1 is a schematic diagram illustrating the interaction between various remotely distributed portions of the subject system implemented in accordance with one embodiment of the present invention.

Turning now to FIG. 1, the subject database management system 10 operates generally to provide centralized access via a host platform 100 located at a host site to the files of a distributed database stored there and, perhaps, at a plurality of other electronic storage facilities 200 maintained on computer platforms at remote sites. Such centralized access to the data files is provided for a plurality of remotely located user platforms 300. Preferably, at least communications 130 between host platform 100 and each user platform 300 is carried out over the World Wide Web or other such widely accessible Internet connection. While communications 120 between host platform 100 and a storage facility platform 200 may be similarly carried out, it is preferable for efficient operation that communications 120 occur over a privately accessible network connection.

In such exemplary applications as those wherein a plurality of engineering drawing files of an enterprise are maintained at remotely located platforms, the data contents of even the simplest drawing files are typically extensive enough to render their transfer over the bandwidth-limited links that are readily available quite cumbersome. Furthermore, the diversity of tools and peripheral devices generating the digital drawing files, as well as the diversity of computing environments in which they are operated virtually assures that some disuniformity will exist in the attributes pertaining to different segments of data files forming the distributed database. In addition, the sheer immensity in the number of drawings maintained at various distributed storage sites is often such that reasonably quick access to a particular drawing, even for a user equipped with the drawing's designating information may not be realizable on a consistent basis. Accordingly, adequate programmable measures are provided at host platform 100 to generate, update, and maintain, among other things, a tabulation of index information from which a user platform 300 may establish an Internet link with one or more of the storage facility platforms 200 at which the desired data files are maintained. Appropriate interfacing measures are provided to accommodate the attributes of those desired data files. Appropriate formatting measures are also taken in accordance with the present invention to enable a user's browsing and viewing of select graphically rendered portions of accessed data files upon the establishment of a link for a particular vault or other electronic storage facility platform 200.

In overall concept, the subject database management system 10 operates as follows. The electronic drawing or other document files to be maintained reside—at either the host or any one of the storage facility sites—in one of several general forms. First, the drawing file may have been generated by an electronic scanning process of a paper version then indexed and stored on a system-dedicated storage medium, such as a SCSI-3 disk array or other suitable storage devices/facilities. The electronic files may also reside, particularly where they were originally generated in electronic form, within a pre-existing device such as a NFS, UNIX file server, or a UNIX database (ORACLE, . . . ). In addition, the electronic files may reside within a securely monitored and restrictively controlled electronic 'vault.' The subject database management system 10 enables remote user platforms 300 to simply and efficiently access the desired electronic drawing files, regardless of the form or the physical location at which those files may reside.

Such access to a drawing file physically resident at a particular storage facility platform 200 by a user platform 300 is initiated by that user platform 300 by establishing communications with web host 100 through the World Wide Web or some other widely accessible public network by executing any one of numerous browser packages known in the art such as NETSCAPE NAVIGATOR, MICROSOFT INTERNET EXPLORER, or the like. Host 100 maintains various ISAPI application executable modules in HTTP-accessible form for each remote user platform 300. The various application executable modules made available at host 100 are delivered as dynamically linked libraries (DLL) which are fully multi-threaded; hence, one loaded copy of a module may be concurrently executed by a plurality of users 300 within the same program instance.

The application executable modules thus made available to a user platform 300 are appropriately executed, such that upon the occurrence of secure log-in and other administrative functions, a display screen is graphically generated at user platform 300 prompting a user's entry of a database search query containing either a specific request directly for one or more identified files, or a more general request specifying one or more files that satisfy one or more user-prescribed query conditions. The appropriate application executable module(s) then automatically operates to generate, in accordance with the appropriate system index table entries, one or more HTML links pertaining to the electronic file(s) satisfying the given query. These links are then displayed at user platform 300 for the user to selectively effectuate downloading, browsing, inclusion within a user set, or some other such operation.

Where a user wishes to view a document to either examine particular aspects of a given file's graphic rendering or to quickly browse through a series of such graphic renderings, host 100 operates to retrieve the user-selected file from the appropriate location, then generate a coarse yet sufficiently indicative representation of that file. The degree of coarseness, or resolution, in the graphic representation thus generated will vary with the actual size of the file's true graphic rendering relative to the display screen size on which the representation is to be displayed. In any event, the user is able to view, manipulate, and/or transmit the graphic representation to another location with much greater 'agility' than he/she would if a full downloading of the file were requisite to doing so.

Efficiency in this regard is preserved by establishing a high speed communications link 120 between host 100 and each of the storage facility platforms 200. Preferably, the communications links 120 are realized through a privately accessible intranet such as a local area network (LAN) or, if necessary, a wide area network (WAN). In alternate embodiments, more than one host platform 100 may be employed within system 10—a host platform 100, for instance, being physically located at the site of each storage facility platform 200.

In addition to its file access features described in preceding paragraphs, the subject database management system 10 includes file control features, two main components of which are the transducing and indexing of individual files. In addition to the pre-existing drawing files resident in the file server and database units at the host site, or at various storage facility sites, system 10 maintains files transduced to electronic form by a suitable device such as a scanner. To that end, system 10 preferably includes software and hardware measures for controlling the scan of a paper drawing document to generate an electronic version for both temporary and permanent storage at one or more sites served by host 100. Suitable measures are taken during or following this process to acquire the pertinent identification and attribute information pertaining to a given drawing file and automatically formulate a corresponding entry for the system index table in accordance with an attendant initialization file.

Such indexing of the electronic drawing files to be maintained may be continually or periodically performed upon drawing files newly included in the distributed database. The programmable indexing measures operate in accordance with the present invention to, for instance, reduce from the full UNC path associated with one or more stored file to be indexed in order to extract therefrom such embedded information as document, sheet, and revision numbers; the type of computing environment from which the file(s) originates; the release date; and the like. Depending upon the information thus extracted for indexing purposes, viewing and other functions via various application executable modules are configured appropriately such that the user is saved the task of manually initiating various interfacing and/or preparatory procedures prior to actually accessing the desired file. In the case of a drawing file residing within an electronic 'vault' for example, the application executable modules operate responsive to information discerned from the system index table to automatically progress through numerous layers of prompted queries to which a user himself/herself would otherwise have to step tediously through.

Figure 2:
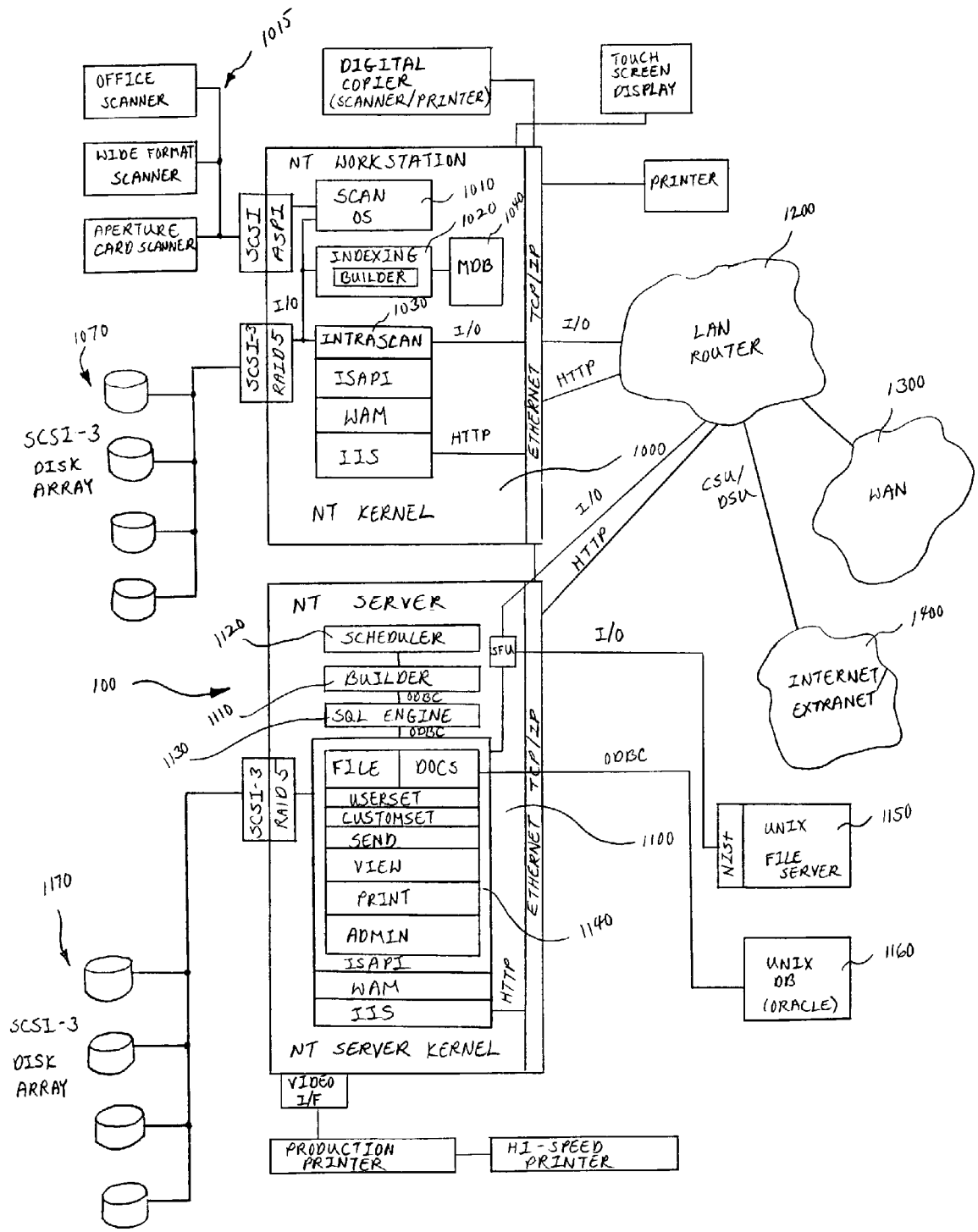
FIG. 2 is a schematic diagram illustrating an exemplary configuration of one portion of the subject system implemented in accordance with one embodiment of the present invention.
Figure 3:
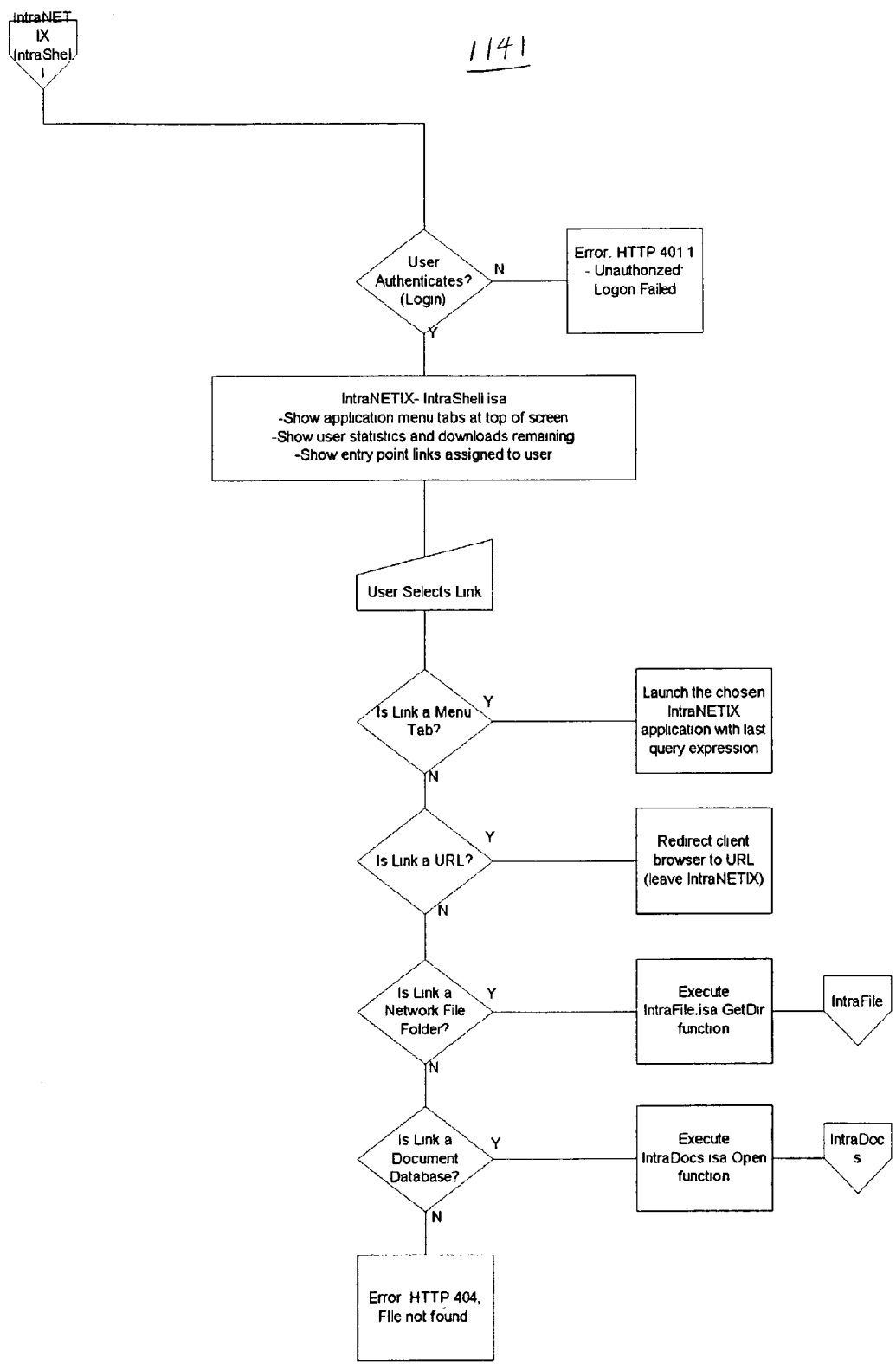
FIG. 3 is a flow diagram illustrating a first exemplary application executable module programmably implemented in one embodiment of the present invention.

Turning now to FIG. 2, there is shown a block diagram illustrating in greater detail the main functional components of (and coupled to) a host 100 formed in accordance with the present invention. Host 100 includes a number of conventional components individually known in the art. For purposes of clarity, individual discussion of such known components is avoided except to the extent necessary to clarify various aspects of the present invention.

Host 100 preferably includes a workstation 1000 and a server 1100 operably coupled one to the other via an ETHERNET TCP/IP connection. Workstation 1000 and server 1100 are preferably implemented in a MICROSOFT NT operating system environment and coupled via the given enterprise's intranet to others of the enterprise's distributed computing platforms at which drawing files reside. Preferably, workstation 1000 and server 1100 are each coupled to a LAN router 1200 through which a WAN 1300 may be accessed to establish a private high speed link with remote sites of the enterprise. Workstation 1000 and server 1100 may also be coupled through LAN router 1200 to other remote computing platforms via a publicly accessible Internet 1400. Files stored—on such devices as a file server 1150, dedicated database machine 1160; an electronic 'vault' (not shown); or dedicated disk arrays 1070 and 1170—at various remote storage facility sites 200 are thus retrieval by host 100 through the enterprise's intranet, as are files locally available.

Workstation 1000 includes among its components a Scan OS 1010 which controls one or more various scanner devices 1015 connected thereto to transduce paper drawing documents to electronic files. Scan OS component 1010 stores the generated drawing files within disk array 1070, and an indexing component 1020 thereafter generates the indexing entries for the given system index table. The index entries are temporarily stored in a database 1040 for more permanent storage elsewhere at a later time. Indexing component 1020 may be operated either on demand or periodically, in accordance with a preprogrammed operating schedule.

Where an electronic file is being generated from a transduced paper drawing, information such as drawing number, sheet number, revision number, and the like, may be provided for indexing component 1020 in a number of ways. First, the information may be manually entered. They may also be provided in a more automated manner via computer readable aperture cards of any suitable type known in the art. Alternatively, the information may be automatically acquired via an OCR function which enables information contained in standard pre-defined regions of the scanned drawing to be electronically discerned.

Workstation 1000 also includes, preferably, an Intrascan component 1030 which effectively maintains a log within an immediately preceding period of time that, depending on the memory resources available, may extend to days or weeks of periodic scanning operation. Both local and remote users may then access recently processed drawing files through Intrascan component 1030 without having to query the entire system to locate that particular drawing file.

Server 1100 includes among its components a Builder component 1110 which serves the indexing function for drawings that are to be added to the system which pre-exist in electronic form—though they may reside at distributed locations on various computing platforms. Builder component 1110 may be operated either on demand or periodically in accordance with an operating schedule predefined by a scheduler component 1120.

Preferably, Builder component 1110 executes generally to generate, update, and maintain an index table for the distributed database. More specifically, Builder 1110 executes in accordance with configurational settings defined in one or more initialization file processed therewith. Builder component 1110 thus generates, at least for each drawing file not scanned at its introduction into the subject distributed database management system, a corresponding file record. It does so by automatically populating the system index table with the predetermined index fields attributable to that record.

Preferably, a file record includes such index fields as those indicative of the name, user name, and password by which the given data is indexed; the full path pertaining to the file or files to be indexed; the document number, sheet, and revision numbers corresponding to a particular file to be indexed; the computing environment from which the particular file originated; and the like. What results, then, is a series of file records for the dispersed drawing files of the distributed database, each of which provides the information necessary for a user platform 300 to establish a direct document link with the appropriate storage facility platform 200 and establish a fully compatible interface for viewing and actuating other action steps therefor.

An exemplary initialization (or, 'ini') file is shown in the following example.

EXAMPLE 1

```
[DSN]
ORACLE.EDVS
username
password
[FOLDER]
\\ykserv03.yk.udlp.com\data\u2rl\cgm\* .cgm
DOCNUMBER
L4;-;_;x;
SHEET
R0;_;-;x;
REV
R1_;-;
ORIGIN
ST;UNIX
PRODUCTGROUP
ST;U2
[END]
[FOLDER]
\\ykserv03.yk.udlp.com\data\pserl\cgms\*.cgm
DOCNUMBER
L4;-;_;x;
SHEET
R0;_;-;X;
REV
R1;_;-;
ORIGIN
ST;UNIX
PRODUCTGROUP
ST;PSE
[END]
[FOLDER]
\\ykserv03.yk.udlp.com\data\rlm88irv\ugparts\cgm\* .cgm
DOCNUMBER
L4;-;_;x;
SHEET
R0;_;-;x;
REV
R1_;-;
ORIGIN
ST;UNIX
PRODUCTGROUP
ST;HERCULES
[END]
[DAT]
c:\builder\grzcgms.dat
DOCNUMBER
L4;-;
REV
R4;-;X;\;
SHEET
L5;.;
ORIGIN
ST;UNIX
PRODUCTGROUP
ST;GRIZZLY
[END]
[EOF]
```

The first entry in this exemplary 'ini' file is the DSN (Data Source Name) token, followed by the DSN name, username, and password that Builder component 1110 uses for indexing the data. The DSN must exist or be created beforehand, in the ODBC Data Sources applet in the Control Panel (or Administrative Tools) folder of the computer on which builder.exe is running. There must be at least one existing record in the database table that the DSN points to for Builder to run correctly. There is only one DSN entry per ini file, and that entry is always the first entry.

[DSN]

ORACLE.EDVS

Username

Password

The next entry is a FOLDER token, followed by the full UNC path or local drive letter and path and search pattern that supports '?' (single place) and '*' (multiple place) wildcards. The following sets Builder to scan for all.cgm files in folder \data\u2rl\cgm, on machine ykserv03.yk.udlp.com.

[FOLDER]

\\ykserv03.yk.udlp.com\data\u2rl\cgm\* .cgm

Next will follow any number of field name, field rule pairs. This tells Builder how to populate index fields for each file record inserted into the database. The following will populate the DOCNUMBER field. Note that the DOCNUMBER field must already exist in the database table that the DSN points to, as Builder will not create new fields.

DOCNUMBER

L4;-;_;x;

The field rule appears on the line immediately following the field name. There are three type of rules, L, R, and ST. This exemplary line shows the L type and instructs builder to extract DOCNUMBER from the left side of the filename. Builder will proceed from the left side until it encounters an occurrence of a delimiter, defined here as -,_, or x. The numeral 4 following the L tells Builder to ignore delimiters up to and including the fourth character position. For instance, if the file Builder is trying to index was called abc-12345-x04_01.cgm, then DOCNUMBER will be inserted as abc-, 12345. With the numeral 4 following the L, the first—delimiter was ignored. If all character positions are to be valid for delimiters, then L0; may be used instead of L4;.

The next field name, field rule pair corresponds to the SHEET field.

SHEET

R0;_;-x;

This field rule is of type R, which instructs Builder to extract the SHEET field beginning from the right side of the filename, so abc-12345-x04;_01.cgm would yield the insertion of 01 for SHEET field.

The next field name, field rule pair corresponds to the REV field.

REV

R1;_;-;

This field rule is again of type R, which will instruct Builder to begin looking for the REV field value where the last R type operation left off, advancing from right to left. The file abc-12345-x04;_01 would yield x04 as a value for REV, because x was not specified as a delimiter in this field rule. If the field rule were type L, then it would look at the position following the position at which the last L field rule type operation left off, advancing from left to right. In this case, the field rule would produce the same result. The first and last semicolons in the field rule are mandatory, but individual delimiters need not be separated by semicolons.

It would be useful to use any lower (or upper) case letter as a delimiter with something like:

L1;abcdefghijklmnopqrstuvwxyz;

The last field rule type is ST.

ORIGIN

ST;UNIX

The ST field rule type stands for static. This instructs Builder to use the text following ST; in the field rule to populate the field. In this case the ORIGIN field will be inserted with UNIX as the field value for all the files being scanned for this folder.

The REL_DATE field of each record will be set to the date of last modification for each file being indexed.

Each [FOLDER] entry must be terminated with an [END] token.

The next two FOLDER entries are similar, which brings us down to the [DAT] token.

[DAT]

c:\builder\grzcgms.dat

The DAT token is followed by the full path of a data file that is an ASCII text file listing of files to be indexed. This allows filing systems to be indexed where very few files are stored in each folder, and where field information is stored in the folder names. The following is a sample of the dat file's contents:

ykserv03/data/grzrl/as/cmv00513-x0/1/ddraw.cgm   06   24   1999
ykserv03/dat/grzrl/as/cmv00514-x0/1.cgm 07 19 1999
ykserv03/data/grzrl/as/cmv00515-x0/2.cgm 01 4 08:01

Each entry contains the full path and filename location of the file to index, and a date record. There is one file entry per line. The date record, if present, will be used to populate a field named REL_DATE, if this field exists in the database table. This data file was captured from a Unix folder directory listing. Notice that the last file is assigned a time stamp instead of a year. Builder will assume the file is less than 6 months old, and use the appropriate year in REL_DATE. Also note that either slash characters ('\' or '/') can be used for folder separators. Thus, the line entry ykserv03/data/grzrl/as/cmv00513-x0/1/ddraw.cgm could alternatively be expressed as \\ykserv03\data\grzrl\as\cmv00513-x0\1\ddraw.cgm.

Notably, the field rules for L and R types are different. The number that follows the L or the R has a different meaning in the DAT entry. It is used instead to indicate a folder separator (slash characters '\' or '/') position to extract field information from.

So the following field name, field rule DAT entries would result:
DOCNUMBER
L4;-;
REV
R4;-;X;\;
SHEET
L5;,;
ORIGIN
ST;UNIX Produces:
DOCNUMBER=CMV00513
REV=0
SHEET=1/DDRAW
ORIGIN=UNIX
REL_DATE=990624
DOCNUMBER=CMV00514

REV=0
SHEET=1
ORIGIN=UNIX
REL_DATE=990719
DOCNUMBER=CMV00515
REV=0
SHEET=2
ORIGIN=UNIX
REL_DATE=000104

From a DAT file containing:
ykserv03/data/grzrl/as/cmv00513-x0/1/ddraw.cgm 06 24 1999
ykserv03/dat/grzrl/as/cmv00514-x0/1.cgm 07 19 1999
ykserv03/data/grzrl/as/cmv00515-x0/2.cgm 01 4 08:01

Each [DAT] entry must be terminated with an [END] token, and each builder INI file must be terminated with an [EOF] token.

Server 1100 also includes a search engine 1130 which operates responsive to user-prompted queries to locate one or more drawing files sought by the user. Server 1100 includes, moreover, a number of ISAPI application executable modules 1140 accessible to both local and remote users through either the intranet or Internet links established with host 100.

Referring now to FIGS. 3–10, flow diagrams for executable modules programmably implemented in a preferred embodiment of server 1100 are respectively shown. Each of the modules is accessible for execution to a plurality of remotely located users as fully multi-threaded Dynamically Linked Libraries (DLLs). Among the modules is an Intrashell module 1141 shown in FIG. 3. Intrashell module 1141 operates, generally, to lead a user through a login process. It also generates and carries out responsive to appropriate user prompts a plurality of basic links to such things as a menu tab, a URL, a network file folder, or a document database.

Based on the link selected by a user, Intrashell module 1141 may launch another of the application executable modules. For instance, where a user selects a link from a menu tab displayed for him/her, Intrashell 1141 launches the module corresponding to that menu tab item. Where the user links to a network file folder, intrashell module 1141 executes the intrafile module shown in FIG. 4. Where the user selects a document database link, intrashell module 1141 executes the intradocs module shown in FIG. 5. Where a user selects a URL link, however, intrashall module 1141 simply redirects the user's browser to the selected URL.

Figure 4:
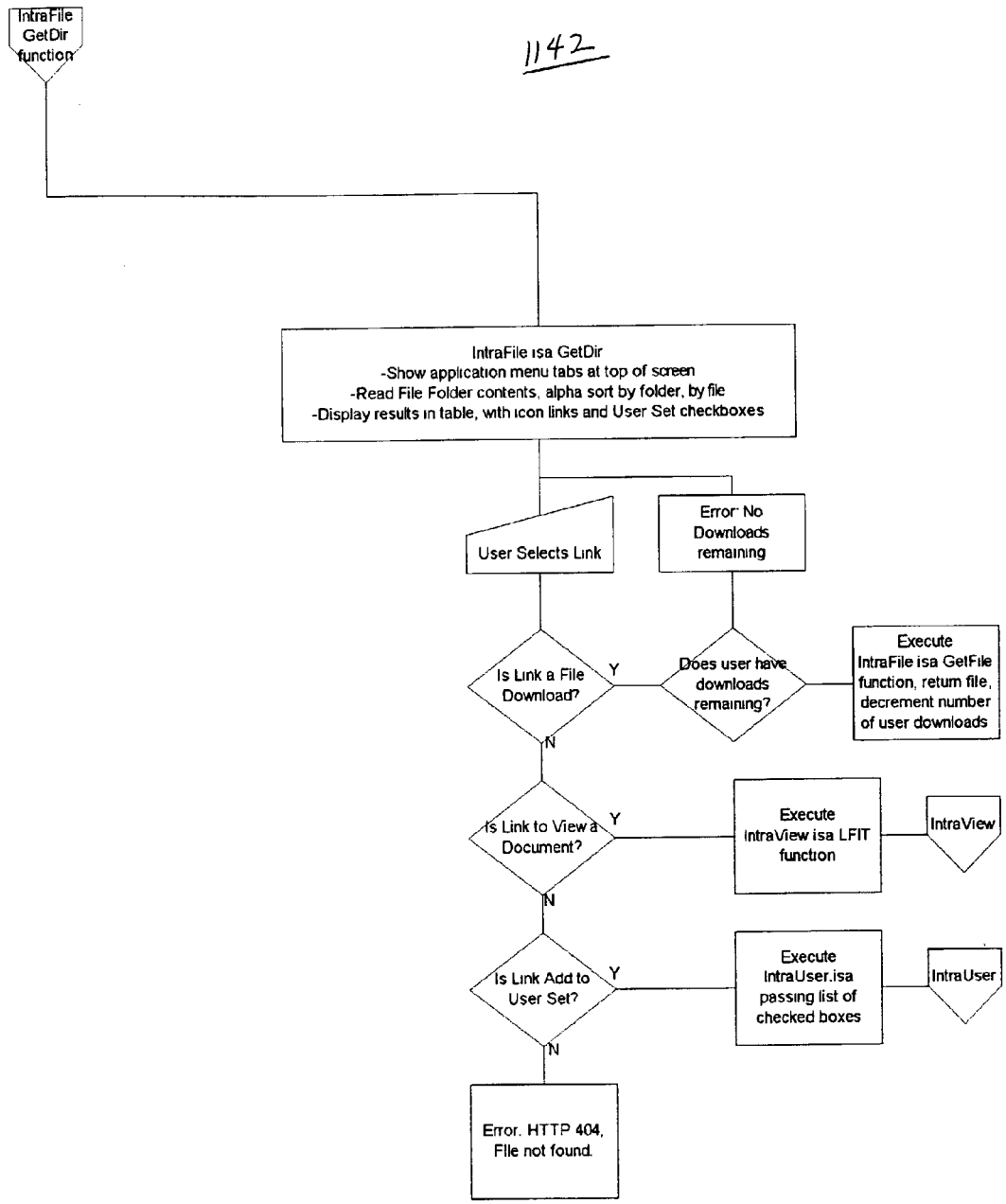
FIG. 4 is a flow diagram illustrating a second exemplary application executable module programmably implemented in one embodiment of the present invention.

Referring to FIG. 4, a flow diagram of the intrafile module 1142 is shown. Intrafile module 1142 executes to display for the user a plurality of menu tab options along with a table of files found in the given file folder containing icon links and user set check boxes. In reading the contents of the given file folder, intrafile module 1142 performs an alpha sort. This alpha sort process operates to, among other things, correctly locate a drawing file having a particular name.

Intrafile module 1142 operates responsive to operation of the administration modules described in following paragraphs to initially check the availability of pre-authorized downloads for the given user. Where the check is satisfied, intrafile module 1142 executes the appropriate file downloads requested by the user. Where the user is not requesting a file download, intrafile module 1142 launches either the intraview module of FIG. 6 or the intrauser module of FIG. 7, depending on the link selected by the user.

Figure 5:
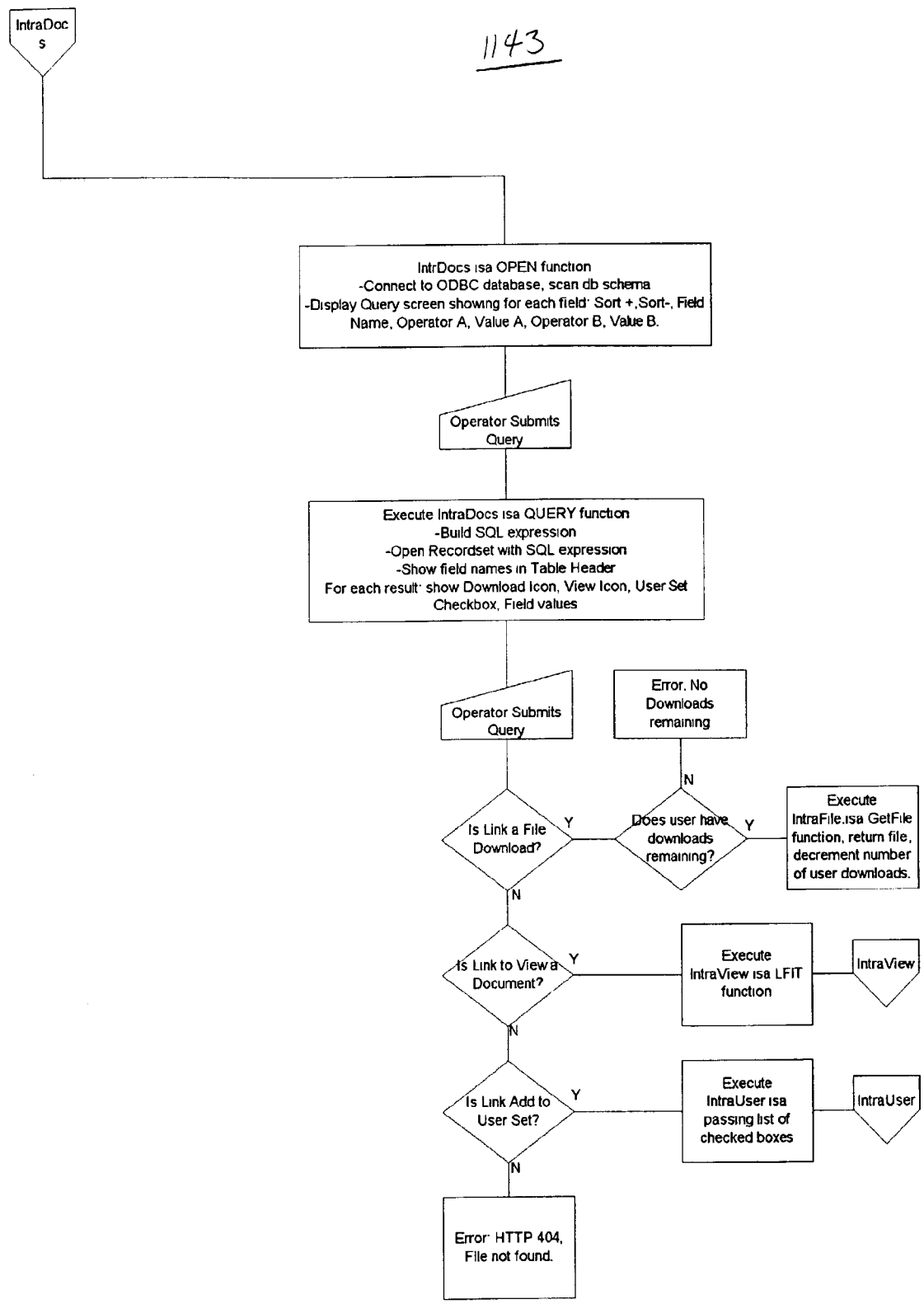
FIG. 5 is a flow diagram illustrating a third exemplary application executable module programmably implemented in one embodiment of the present invention.

Referring to FIG. 5, there is shown a flow diagram of the intradocs module 1143. Intradocs module 1143 operates to establish for the user connections to the various databases available for access within system 10. Intradocs module 1143 also operates to display for the user a query screen whereby he/she may build, for instance, an SQL query expression employing one or more predetermined operators. Responsive to the user's submission of a query, intradocs module 1143 returns the results in table form on the user's display. The displayed table preferably contains download and view icons, as well as user check boxes and field values.

Intradocs module 1143 then operates in accordance with the administration modules in much the same manner that intrafile module 1142 operates. Accordingly, where the user seeks a file download and satisfies the administrative check for the availability of his/her pre-authorized downloads, intradocs module 1143 operates to execute the intrafile module 1142. It also operates where the user simply wishes to either view a drawing file or add it to a user set by executing either the intraview or intrauser modules.

Typically, in known drawing file maintenance systems, the computing tools employed for automated revision control invariably attribute by default higher chronological priority to numerals than to alphabet characters. This often becomes quite problematic, as standard practice in many industries is to attribute higher chronological priority to alphabetic characters than to numerals. Where the number of revisions accrue to a revision 'number' exceeding the number of alphabetic characters, revision 'numbers' beginning with a numeral rather than an alphabetic character would be resorted to. Preferably, intradocs module 1143 executes measures to rectify the inconsistency by attributing to the given file's alphanumeric characters the chronological priorities recognized by the industry in question.

Figure 6:
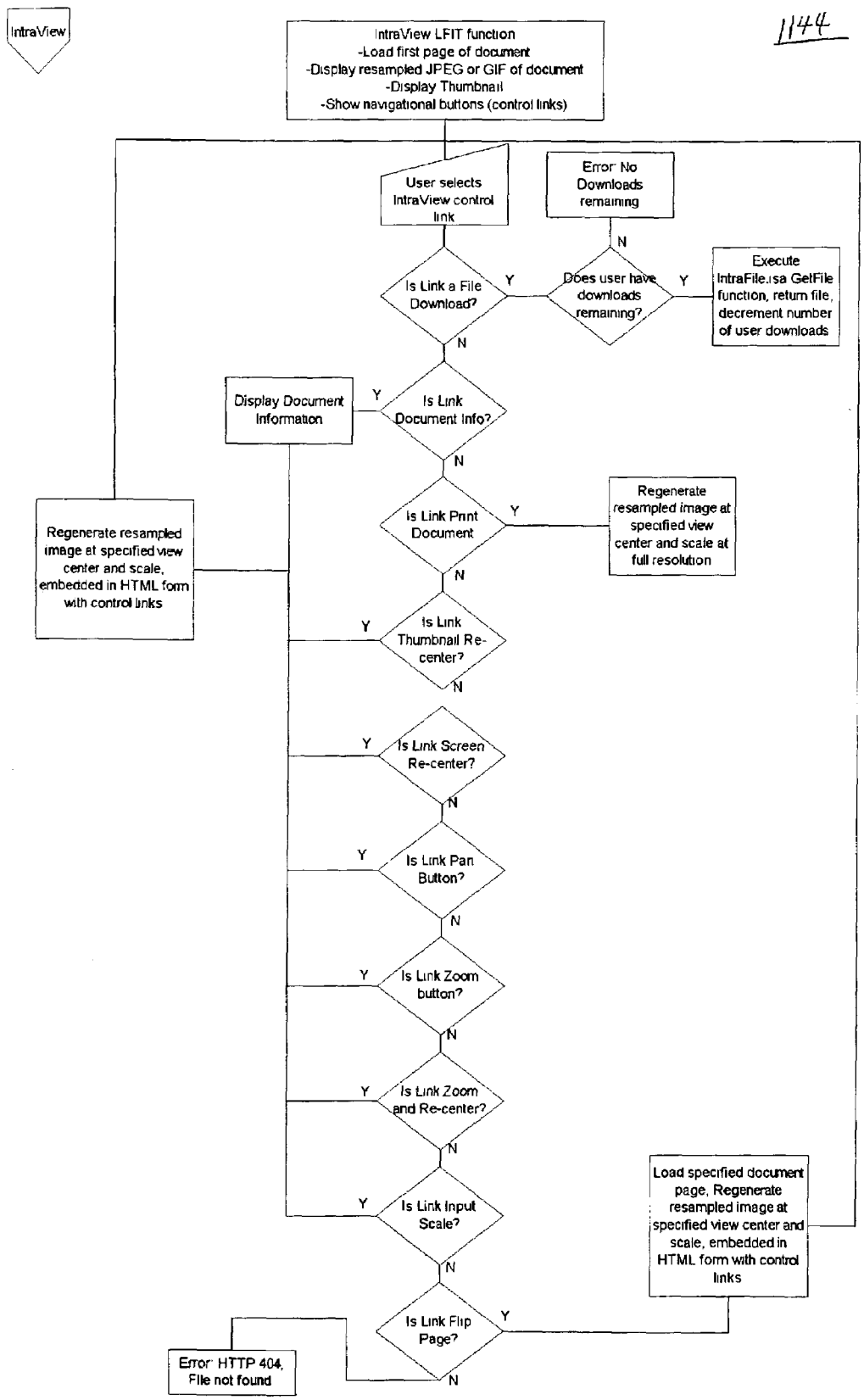
FIG. 6 is a flow diagram illustrating a fourth exemplary application executable module programmably implemented in one embodiment of the present invention.

Turning now to FIG. 6, a flow diagram of the intraview module 1144 is shown. Intraview module 1144 operates to load the first page of the drawing file in question, generating and displaying a resampled JPEG or GIF version of that first page. Intraview module displays also a thumbnail as well as various control links in the form of navigational buttons. Again, where a file download link is selected by the user, the flow proceeds as described above to the administrative check, whereupon intrafile module 1142 is executed if appropriate. If a document information link is selected by the user, the document information is displayed, and the document page specified by the user is loaded. The resampled image of that page is then regenerated at the user-specified view center and scale, and embedded in HTML form with control links. This process is repeated for each of the control links which preferably include such control actions as: thumbnail re-center, pan, zoom, zoom and re-center, scale, and flip page.

Figure 7:
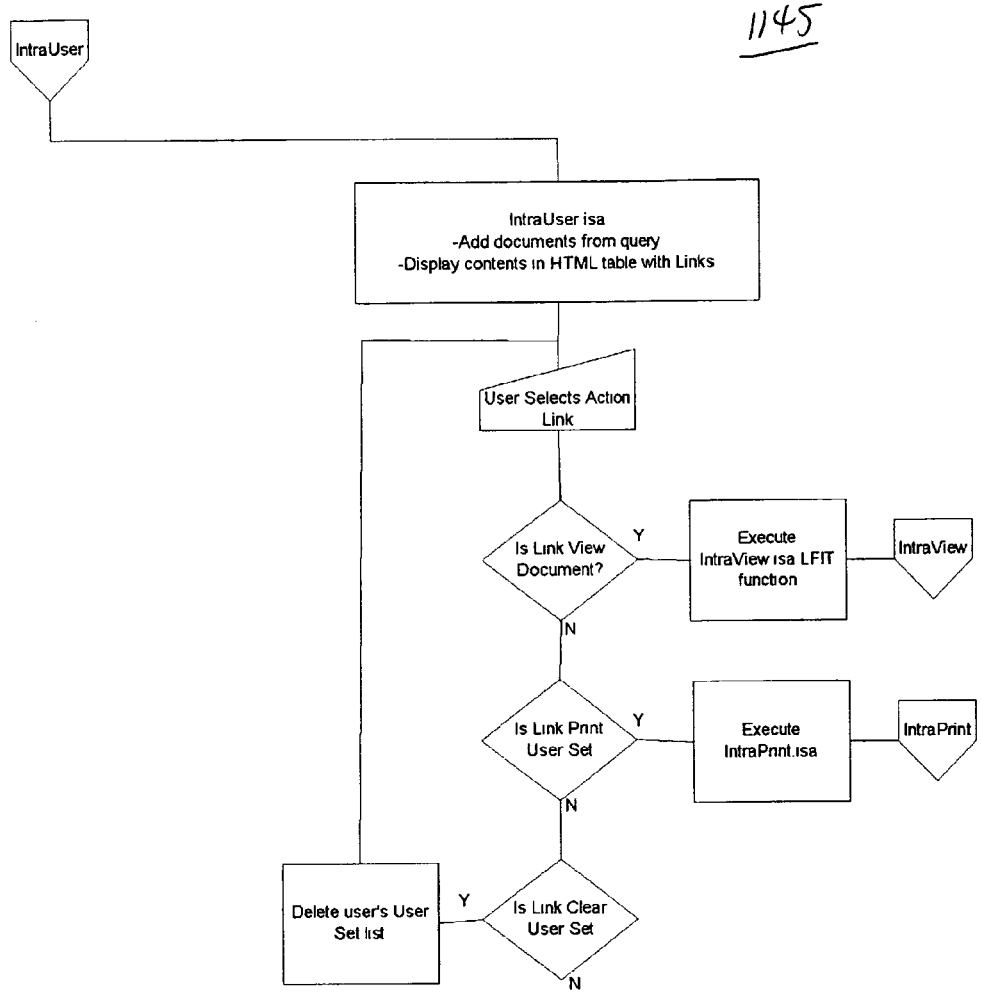
FIG. 7 is a flow diagram illustrating a fifth exemplary application executable module programmably implemented in one embodiment of the present invention.

Turning now to FIG. 7, there is shown a flow diagram of the intrauser module 1145. Intrauser module 1145 serves to build and control for a user a user set containing one or more selected drawing document files. In doing so, it displays the given user set's contents in an HTML table having appropriate links. When the user selects a particular action link, intrauser module 1145 executes the appropriate module—such as the intraview or intraprint modules—corresponding to the selected action link. Where the selected action link is a clear user set link, the user set list currently maintained for the user is deleted.

Figure 8:
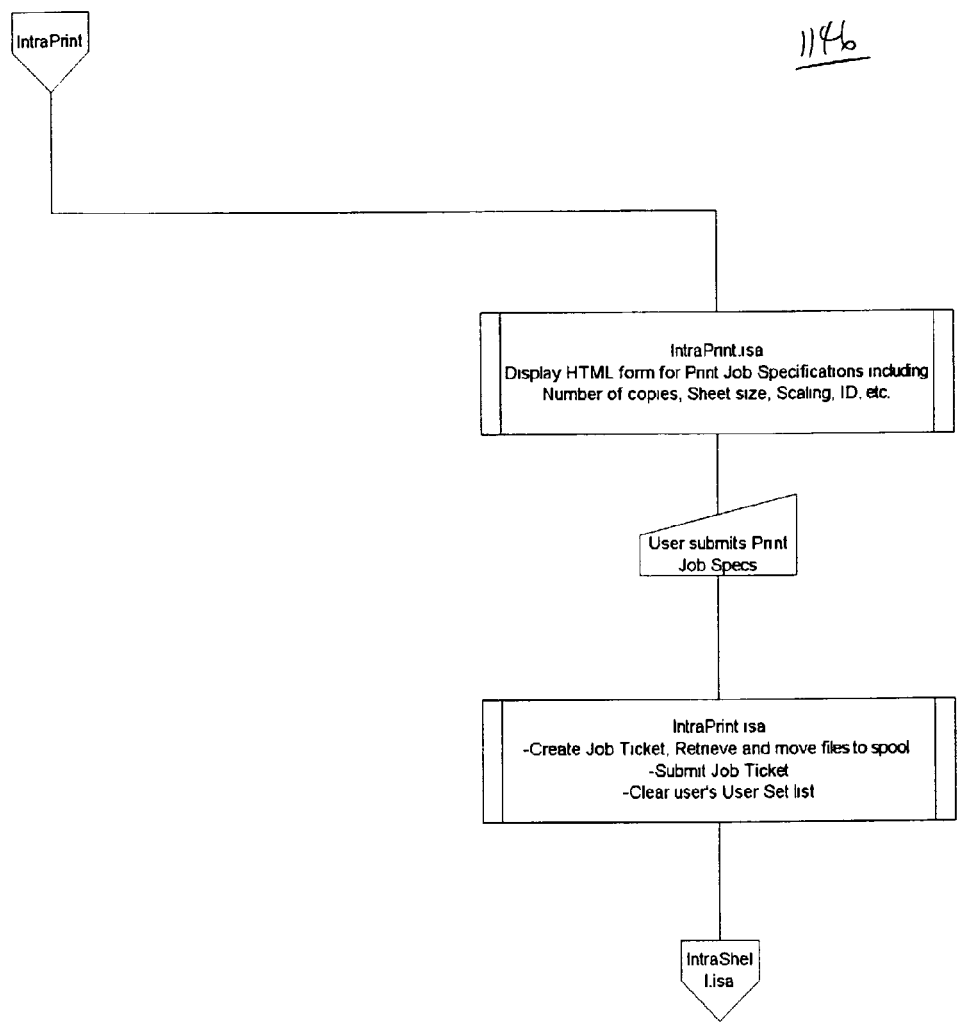
FIG. 8 is a flow diagram illustrating a sixth exemplary application executable module programmably implemented in one embodiment of the present invention.

Referring to FIG. 8, there is shown a flow diagram of the intraprint module 1146. Intraprint module 1146 operates to display the HTML form for print job specifications such as the number of copies, sheet size, scaling, identification, and the like. Once the user submits the print job specifications, intraprint module 1146 operates to create an appropriate job ticket, then to retrieve and move appropriate files to a print spool. It then submits the job ticket as necessary and, thereafter, clears the current user set list, returning control to intrashell module 1141.

Figure 9:
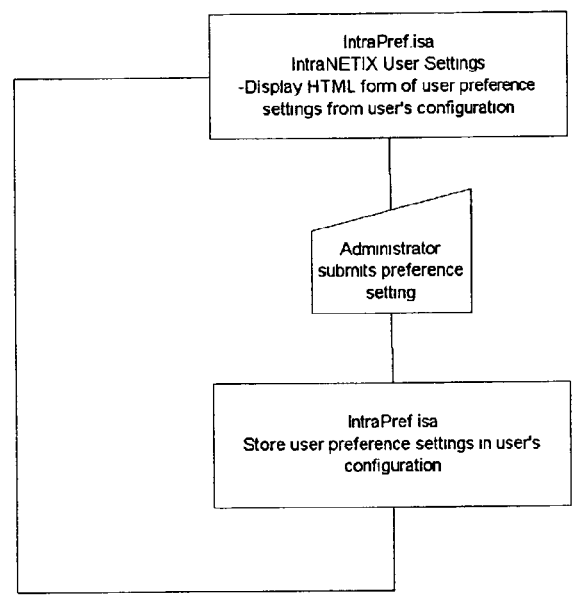
FIG. 9 is a flow diagram illustrating a seventh exemplary application executable module programmably implemented in one embodiment of the present invention; and, FIG. 10 is a flow diagram illustrating an eighth exemplary application executable module programmably implemented in one embodiment of the present invention.
Figure 10:
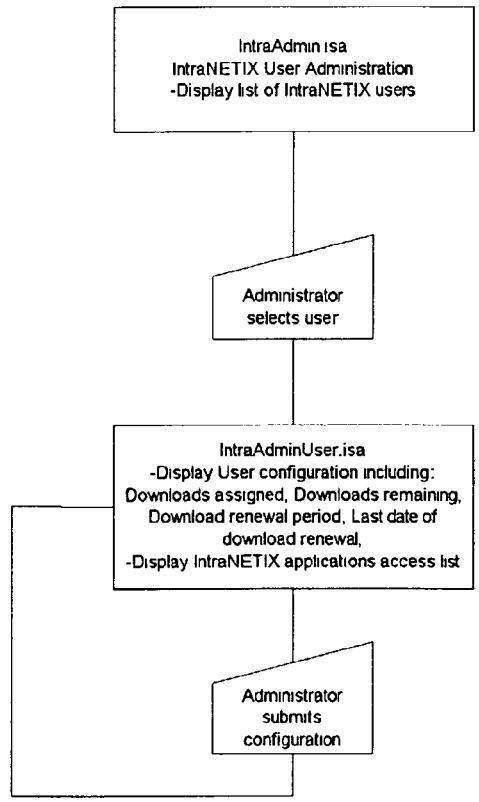

Referring now to FIGS. 9 and 10, server 1100 preferably carries out administrative functions of two basic types. First, it carries out the setting of various user preferences. It also carries out the setting and maintenance of the authentication of users and various user-requested actions. FIG. 9 shows a flow diagram of the intrapref module 1147 which effectively executes the first of these administrative function types. It operates to display the HTML form of user preference settings predefined in accordance with the user's configuration information. As user personnel submit user preference settings, intrapref module 1147 updates the user's current configuration information with those submitted preference settings. The HTML form of the updated user preference settings are thereafter displayed for administration personnel.

FIG. 10 shows a flow diagram of the intraadmin module 1148 which effectively executes the second of the basic administrative function types carried out by server 1100. Intraadmin module 1148 displays for administration personnel the current list of all authorized system users. Upon an administrator's selection of a user, intraadmin module 1148 displays for him/her the user's current configuration information. This configuration information preferably includes such things as the number of downloads authorized for the particular user, the number of unused downloads presently remaining, the download renewal period, and the last date of download renewal. Intraadmin module 1148 also displays the list of system applications that the particular user is authorized to access. The display of such information is updated upon the administrator's subsequent submission of further configuration information for the particular user.

Although this invention has been described in connection with specific forms and embodiments thereof, it will be appreciated that various modifications other than those discussed above may be resorted to without departing from the spirit or scope of the invention. For example, equivalent modules, components, or other elements may be substituted for those specifically shown and described; certain features may be used independently of other features; and in certain cases, particular combinations of system control/management or system data processing steps may be reversed or interposed, all without departing from the spirit or scope of the invention as defined in the appended claims.

What is claimed is:

1. A distributed database management system comprising:
at least one host platform disposed at a first site, at least one storage facility disposed at a second site remote from said first site, and at least one user platform disposed at a third site remote from said first and second sites, said storage facility and said user platform being computer network coupled to said host platform for communication therewith;
said storage facility retrievably storing therein a plurality of electronic data files for respectively generating graphic images of different form;
said host platform being programmably configured to automatically control access to said electronic data files by said user platform, said host platform maintaining a system index table containing for each said electronic data file at least one file record of identifying attributes corresponding thereto, said attributes including an alphanumeric document identifier, a document sheet indicator, and a document revision indicator, said host platform being operable to automatically generate said file record in accordance with a preselected set of configurational parameters in a manner corresponding to the form of said electronic data file;
said host platform including first and second builder components selectively operable to generate said file records respectively for said electronic data files acquired from a printed medium and from an electronically stored medium, said file records being entered in said system index table;
said host platform including a plurality of application modules selectively executable responsive to actuation by said user platform, said host platform being operable thereby to selectively retrieve at least portions of said electronic data files for graphic reproduction at said user platform, said application modules including a module for searching said system index table responsive to a search query generated by said user platform pertaining to at least one said graphic image;
wherein said application modules of said host platform are concurrently accessible to a plurality of said user platforms, said application modules being maintained as fully multi-threaded dynamically linked libraries (DLLs).

2. The distributed database management system as recited in claim 1 wherein said application modules include a module executable to alternatively generate from selected ones of said electronic data files resampled images having partial and full resolution.

3. The distributed database management system as recited in claim 1 wherein said host platform is operable to generate responsive to said search query at least one of a plurality of predefined HTML control links for selection by said user platform.

4. The distributed database management system as recited in claim 1 wherein said host platform is operable to cumulatively generate responsive to actuation by said user platform a user set for retrieval of and subsequent action upon a plurality of selected electronic data files.

5. The distributed database management system as recited in claim 1 wherein said host platform includes a server and at least one workstation coupled thereto, said server including said second builder component for automatically generating said file records to be entered in said system index table.

6. The distributed database management system as recited in claim 5 wherein said workstation includes a scan component for transducing printed versions of archived documents to electronic data file form, and an indexing component for generating said file records to be entered in said system index table corresponding to said transduced documents.

7. The distributed database management system as recited in claim 1 comprising a plurality of said user platforms remotely disposed one from the other, each said user platform being operably coupled to said host platform by a publicly accessible computer network.

8. The distributed database management system as recited in claim 7 wherein said host platform is operably coupled to said storage facility by an access limited private computer network.

9. A distributed database management system comprising:
(a) a plurality of storage facilities for retrievably storing therein a plurality of electronic data files for respective graphic display of a plurality of archived documents of different form;
(b) a plurality of user platforms each disposed remotely from said storage facility; and, (c) at least one host platform coupled by computer network to each of said storage facilities and said user platforms for communication therewith, said host platform being remotely disposed from said storage facilities and said user platforms, said host platform being programmably configured to automatically control selective access to each of said electronic data files by each of said user platforms, said host platform being operable to generate and automatically populate a system index table in accordance with a plurality of predefined configurational parameter sets in a manner corresponding to the form of each said electronic data file, said index table containing for each said electronic data file at least one file record of identifying attributes uniquely corresponding thereto, said attributes including an alphanumeric document identifier, a document sheet indicator, and a document revision indicator;

said host platform including first and second builder components selectively operable to generate said file records respectively for said electronic data files acquired from a printed medium and from an electronically stored medium, said file records being entered in said system index table;

said host platform including a plurality of application modules selectively executable responsive to actuation by at least one said user platform, said host platform being operable thereby to selectively retrieve at least portions of said electronic data files for graphic reproduction at said user platform, said application modules including a module for searching said system index table responsive to a search query generated by said user platforms pertaining to at least one said archived document;

wherein said application modules of said host platform are concurrently accessible to a plurality of said user platforms, said application modules being maintained as fully multi-threaded dynamically linked libraries (DLLs).

10. The distributed database management system as recited in claim 9 wherein said application modules include:
(a) an intrashell module having a component for controlling access authentication of said user platforms;
(b) an intrafile module having a component for retrieving responsive to actuation by one said user platform selected ones of said electronic data files;
(c) an intradocs module having a component for receiving and processing a search query generated by one said user platform;
(d) an intraview module having a component for alternatively generating from selected ones of said electronic data file resampled images having partial resolution and full resolution;
(e) an intrauser module having a component for cumulatively generating responsive to actuation by one said user platform a user set for retrieval of and subsequent action upon a plurality of selected ones of said electronic data files;
(f) an intraprint module having a component for configuring and transmitting print jobs responsive to actuation by one said user platform; and,
(g) at least one administrative module for setting a plurality of preference parameters and maintaining system access authorization information.

11. The distributed database management system as recited in claim 11 wherein said host platform is operable to generate responsive to said search query at least one of a plurality of predefined HTML control links for selection by said user platform.

12. The distributed database management system as recited in claim 9 wherein said host platform includes:
(a) a server including said second builder component for automatically generating said file records to be entered in said system index table; and,
(b) at least one workstation coupled to said server, said workstation including a scan component for transducing printed versions of archived documents to electronic data file form, and an indexing component for generating said file records to be entered in said system index table corresponding to said transduced documents.

13. A method of managing distributed database of data intensive electronic files comprising the steps of:
(a) retrievably storing at a plurality of storage facilities a plurality of electronic data files for graphically reproducing a plurality of archived documents of different form;
(b) establishing a plurality of user platforms each disposed remotely from said storage facility;
(c) establishing at least one host platform at a site remotely disposed from said storage facilities and said user platforms;
(d) establishing a computer network link between said host platform and each said storage facility for communication therewith;
(e) establishing a computer network link between said host platform and each said user platform for communication therewith;
(f) establishing said host platform for centralized access to said electronic data files by said remotely disposed user platforms;
(g) programmably configuring said host platform to generate and automatically populate a system index table in accordance with a plurality of predefined configurational parameter sets in a manner corresponding to the form of each said electronic data file, said index table containing for each said electronic data file at least one file record of identifying attributes uniquely corresponding thereto, said attributes including an alphanumeric document identifier, a document sheet indicator, and a document revision indicator;
(h) providing in said host platform first and second builder components selectively operable to generate said file records respectively for said electronic data files acquired from a printed medium and from an electronically stored medium, said file records being entered in said system index table; and,
(i) maintaining at said host platform a plurality of application modules selectively executable responsive to actuation by at least one said user platform, said host platform being operable thereby to selectively retrieve at least portions of said electronic data files for graphic reproduction at said user platform, said application modules including a module for searching said system index table responsive to a search query generated by said user platforms pertaining to at least one said archived document;
(j) maintaining said application modules of said host platform to be concurrently accessible to a plurality of said user platforms, said application modules being maintained as fully multi-threaded dynamically linked libraries (DLLs).

14. The method as recited in claim 13 wherein step (i) includes the step of generating responsive to said search query at least one of a plurality of predefined HTML control links for selection by said user platform.

15. The method as recited in claim 13 further comprising the steps of:
   (a) establishing at said host platform a server including a said second builder component;
   (b) establishing at least one workstation coupled to said server, said workstation including a scan component and an indexing component;
   (c) periodically executing said builder component to automatically generate said file records for entry in said system index table;
   (d) periodically executing said scan component to transduce printed versions of archived documents to electronic data file form; and,
   (e) executing said indexing component thereafter to generate said file records to be entered in said system index table corresponding to said transduced documents.

16. The method as recited in claim 13 further comprising the step of selectively generating responsive to actuation by said user platforms resampled images alternatively having partial and full resolution from retrieved ones of said electronic data files.

17. The method as recited in claim 13 further comprising the steps of operably coupling each said user platform to said host platform by a publicly accessible computer network, and operably coupling each said storage facility to said host platform by an access limited private computer network.

18. The distributed database management system as recited in claim 1 wherein a portion of said identifying attributes is read from said printed medium when said electronic data files are acquired from said printed medium.

* * * * *